United States Patent [19]

Lemelshtrich

[11] 3,998,391
[45] Dec. 21, 1976

[54] FLOW RESTRICTOR AND TRICKLE EMITTER

[76] Inventor: Moshe Lemelshtrich, 100 Petah Tikva Road, Tel Aviv, Israel

[22] Filed: Mar. 25, 1975

[21] Appl. No.: 561,978

[30] Foreign Application Priority Data

Mar. 26, 1974  Israel .................... 44502

[52] U.S. Cl. .............................. 239/542
[51] Int. Cl.² ....................... B05B 15/00
[58] Field of Search ......................... 239/542, 547; 138/42–46

[56] References Cited

UNITED STATES PATENTS

| | | | |
|---|---|---|---|
| 3,791,587 | 2/1974 | Drori | 239/542 X |
| 3,815,636 | 6/1974 | Menzel | 138/43 |
| 3,834,628 | 9/1974 | Selman | 239/542 |
| 3,882,892 | 5/1975 | Menzel | 239/542 X |
| 3,887,139 | 6/1975 | Pearce | 239/542 |
| 3,896,999 | 7/1975 | Barragan | 239/542 X |

FOREIGN PATENTS OR APPLICATIONS 2,224,320  12/1972  Germany .................... 239/542

*Primary Examiner*—John J. Love
*Attorney, Agent, or Firm*—Browdy and Neimark

[57] ABSTRACT

A flow restrictor and trickle emitter is composed of a hollow platelike element in the interior of which a conduit for the flow is provided meandering from one end of the element to the other, an inlet being provided at one end of the said conduit and an outlet or several outlets at various points thereof, means being provided within the said conduit forcing the flow to perform bows and bends within the stretches of conduit intermediate to the two ends of the body.

18 Claims, 10 Drawing Figures

FLOW RESTRICTOR AND TRICKLE EMITTER

BACKGROUND OF INVENTION

The present invention relates to a flow restrictor. As is well known flow restrictors are one of the main components of trickle or drip irrigation systems. The purpose of a flow restrictor is to retard the flow within a predetermined conduit and thereby to reduce the pressure from the head of the source of irrigation water. As a consequence the flow is emitted in the form of a very slow trickle or dropwise. The purpose of these devices — which are also known as "drip emitters" or "trickle emitters" — is to economize in water expenditure and to supply the water in a steady, slow trickle to the point where it is actually needed by the plants or cultures to be irrigated.

DESCRIPTION OF PRIOR ART

As is generally known, the flow restrictors of the prior art comprise conduits which are of a very much restricted cross-sectional area, with the result that water passing therethrough — due to friction — looses pressure; however, the flow occurs at an even higher speed than would be otherwise. In order to retard the flow, in addition to the reduction of pressure it is known to direct the flow through labyrinth like conduits, imposing a great number of bends and bows to the flow.

There are known flow restrictors and emitters constituted by an assembly of two tubular bodies inserted into one another, a passage being formed between the outer wall of the inner and the inner wall of the outer body, the flow of water being conducted in axial stretches of said passage, in to and fro directions from one end of the emitter to the other, the said axial stretches of passage being provided with cross-wise extending ribs or protrusions which cause the flow within these stretches to perform bends.

SUMMARY OF INVENTION

The present invention is a further development of such a flow restrictor and emitter. However, in the construction according to the present invention, the said flow restricting conduits are not provided within tubular bodies telescopingly inserted in one another. The new flow restrictor is composed of a hollow plate-like element in the interior of which a conduit for the flow is provided, such conduit having an inlet adapted to be connected to a feed line of water and at least one outlet leading into the open, such conduit meandering from the inlet of the element to the outlet, means being provided within the said conduit forcing the flow to perform bows and bends within the stretches of conduit intermediate the inlet and the outlet.

OBJECT OF INVENTION

It is the object of the present invention to provide a flow restrictor-cum-emitter of trickle which is easy to manufacture and thus can be put on the market and at the disposal of consumers at very low prices. This latter feature is of a special importance in connection with this commodity, since for every plantation a great number of such flow restrictors has to be provided, sometimes one and even two beside every plant. Obviously, therefore, the initial cost of the individual flow restrictor for trickle irrigation systems has to be kept as low as possible as otherwise the total investment for such a system would be too large, even if the water economy is considered.

BRIEF DESCRIPTION OF DRAWINGS

The invention will now be described with reference to the annexed drawings wherein.

DESCRIPTION OF PREFERRED EMBODIMENTS

In practice the plate shaped body forming the flow restrictor and emitter having the said meandering conduit in its interior will be built up of two plate elements which are joined together matingly, the said conduit being provided in the form of grooves in one or in both plate members. In special cases two or more of the said plate members may be combined by superposing one onto another and establishing communication between their interiors, so that the flow takes place from one restrictor to the next one, exiting from the last one.

Figure 1:
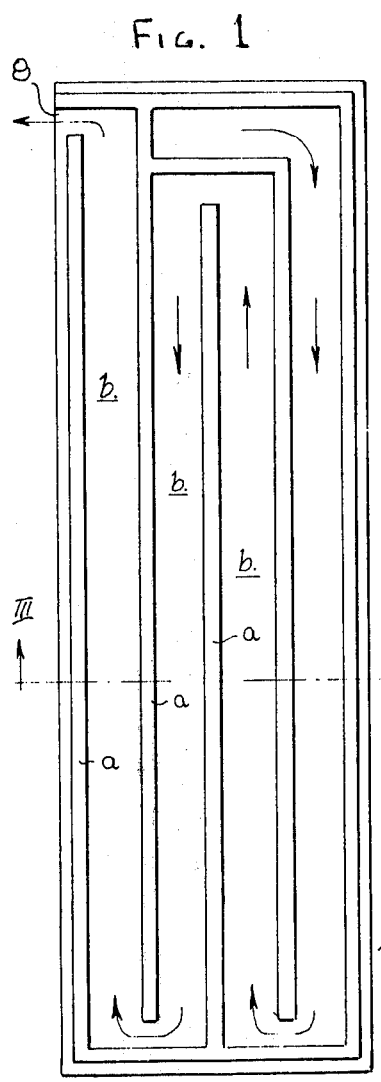
FIG. 1 and FIG. 2 are plan views of two bodies from which one type of the new flow restrictor is composed.
Figure 2:
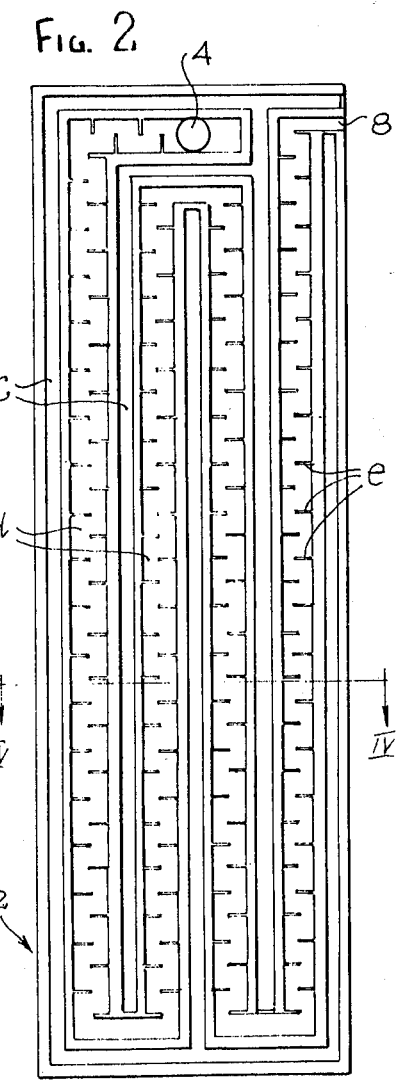
Figure 3:
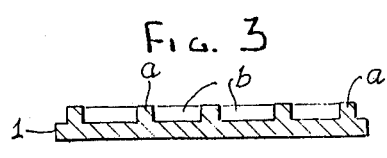
FIGS. 3 and 4 are sectional views on the lines III—III and IV—IV of FIGS. 1 and 2 respectively.
Figure 4:
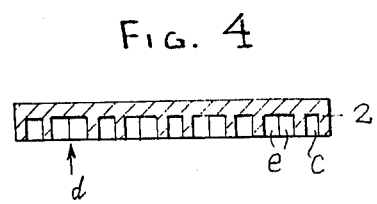

Turning now to FIGS. 1 and 2 the new flow restrictor is built up from a plate 1 and a plate 2. In plate 1 are provided ridges $a$ between which extend depressed portion $b$.

The ridges $a$ extend longitudinally from one end of the plate 1 towards the other end but do not extend to the very edge of the plate. The complementary parts of the flow restrictor, also a plate shaped member, shown in FIG. 2 is provided with channels $c$ into which the ridges $a$ can matingly enter. The bottom of depression $b$ is then flush with the top of the walls flanking the channels $c$. Between the walls defining channels $c$ extend wider grooves $d$ which, when the two plates are laid against one another, register with the depressions $b$ of plate 1. Thus the open side of grooves $d$ is closed by the bottom face of the depression $b$. Within the grooves $d$ extend crosswise short ridges $e$. These latter extend oppositely from the walls defining the channels $c$ towards one another, the ridges $e$ extending from one side being staggered against those extending from the opposite side, all ridges extending approximately to the middle of the groove. At one point of the wide groove $d$, at the beginning thereof, there is provided an inlet port 4 from which a nipple 5 extends outwardly. At the end of the groove $d$ an outlet 8 is provided from which the water can trickle. Preferably at the top side on one of the plates (in the example of plate 2) there are provided, at distances from one another upwardly extending legs 6.

Figure 5:
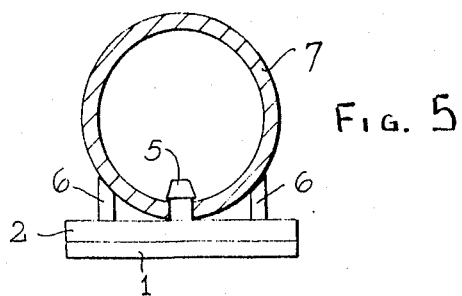
FIG. 5, finally illustrates the new flow restrictor in position on water supply lines.

The new trickle emitter is connected to a water supply line under pressure, say a plastic hose indicated in FIG. 5 by the numeral 7 into which holes are punched at regular distances. Into these holes the nipple 5 is forced, thereby establishing communication between the supply line and the emitter. Water enters through the nipple 5 and the inlet port 4 into the wide groove d formed by the two plates 1 and 2, it flows in the direction of the arrows in FIG. 1 until it reaches the outlet 8 from which it exits at a slow trickle or dropwise. During its passage through the conduit formed by the grooves d, the flow is continuously forced by the ridges e to perform bends, slowing down the speed of flow.

The new flow restrictor and trickle emitter can be manufactured from plastics by conventional methods of moulding and the two pieces can be fused together by heat or welded as it is commonly called. Thus, in a very small number of simple operations, the trickle emitter can be assembled.

Figure 10:
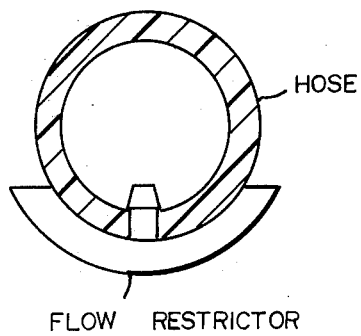
FIG. 10 is an elevation showing a flow restrictor in accordance with the present invention with a slight crosswise curvature.

It would be within the scope of the invention to give the plate members 1 and 2 a slight crosswise curvature (as shown in FIG. 10) so that they would fit onto the outside of the hose to which they are to be attached.

Figure 6:
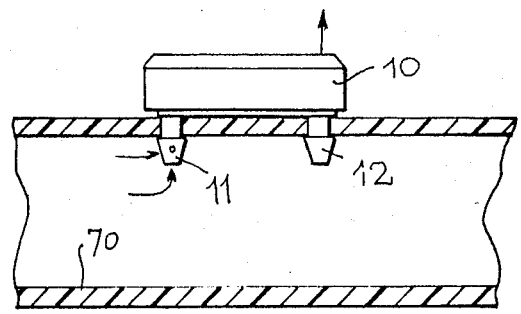
FIG. 6 shows, in an elevation section, another type of flow restrictor and trickle emitter according to the invention.

In the variant shown in FIGS. 5 – 8 the trickle emitter is built up of disc shaped members. The emitter which in FIG. 6 is shown in position on a feed line, e.g. a plastic hose 70, and which is indicated as a whole by the numeral 10 has the shape of a small pill box. From one of its circular faces extend two nipples 11 and 12. Nipple 11 constitutes the inlet into the emitter, while nipple 12 has a "blind" bore and serves only to firmly connect the emitter 10 to, and to stabilize it on, the plastic hose 70.

Figure 7:
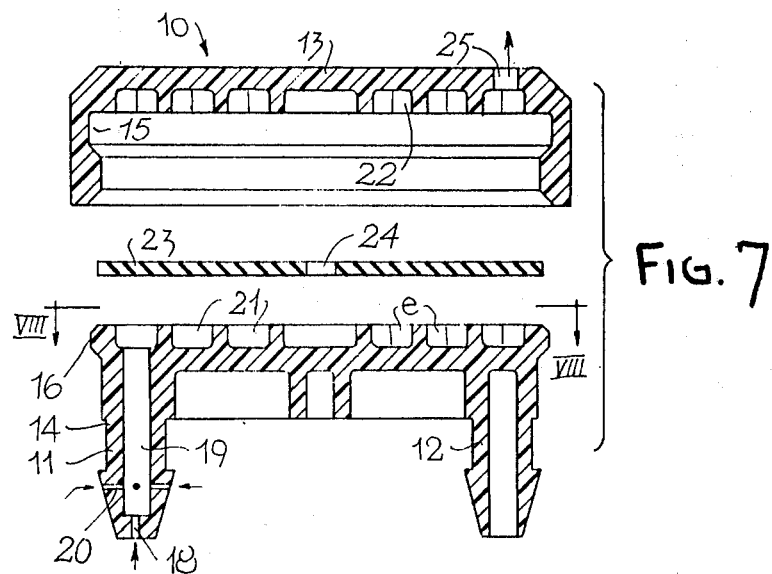
FIG. 7 is an exploded view (on an enlarged scale) of the device shown in FIG. 6.

The build of the emitter 10 will become clear from the exploded view of FIG. 7. The emitter comprises a top part 13 fitting on a bottom part 14. Part 13 has the shape of an inverted, shallow tray. In the circumferential wall of the tray 13 there is provided a groove 15 extending all round the inside of the said wall. The bottom part 14 of the emitter is disc shaped and has a peripheral rib 16. In order to connect parts 13 and 14 with one another, part 14 is forced into the concavity of part 13 until rib 16 snaps into the circumferential groove 15. Once united by press-fitting, as described, the two parts cannot be severed easily from one another.

From the lower side of member 14 extends the nipple 11 which has a narrow inlet 18 leading into a wider bore 19. In addition to inlet 18 there are provided radial inlet bores 20. Bores 18 and 20 are rather small so that even small bodies, grains of sand or organic matter, carried by the water would not enter these bores and clog the passage. If unexpectedly one of the inlets 18–20 is stopped, the flow can continue through the remaining inlets.

Figure 8:
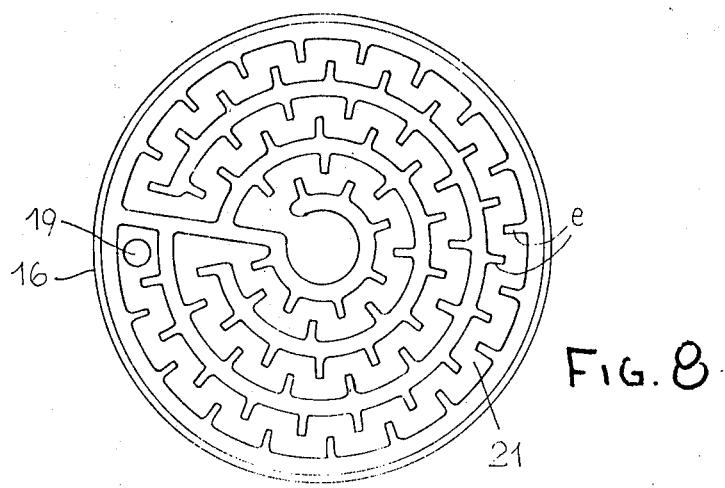
FIG. 8 is a plan view of the part shown undermost in FIG. 7.

The wider bore 19 leads into a meandering groove 21 in the face of member 14. This groove is seen in plan view in FIG. 8 and again throughout its extension there are provided crosswise extending short ridges e corresponding to ridges e described in connection with the emitter shown in FIG. 2. In the emitter of FIG. 8 the ridges are also in staggered order.

The member 13 is provided at its interior with a like meandering groove in which also extend, crosswise to the groove, ridges e.

Before pressfitting part 14 into part 13 a membrane 23 is placed between the two parts, partitioning groove 21 from groove 22. A hole 24 is provided in the center of membrane 23.

An outlet 25 is provided in the topside of member 13.

This emitter functions as follows: The assembled emitter — see FIG. 6 — is fixed on a feed line by inserting the two nipples 11 and 12 fittingly in holes made in the wall of hose 70. Hereby communication is established between the interior of the hose and the interior of the emitter 10, water flows through the inlets 18 and 20 into the bore 19 and enters the groove 21. Here the water flows continuously performing bends around the free ends of ridges e until it reaches the center of the emitter and passes through the hole 24 in the membrane 23 into the groove 22 to flow from the center towards the outlet 25 from which it exits in a slow trickle.

The emitter according to FIGS. 6 – 8 is relatively small but includes a rather long conduit with a great number of bends, thus effectively reducing pressure and speed of flow.

Figure 9:
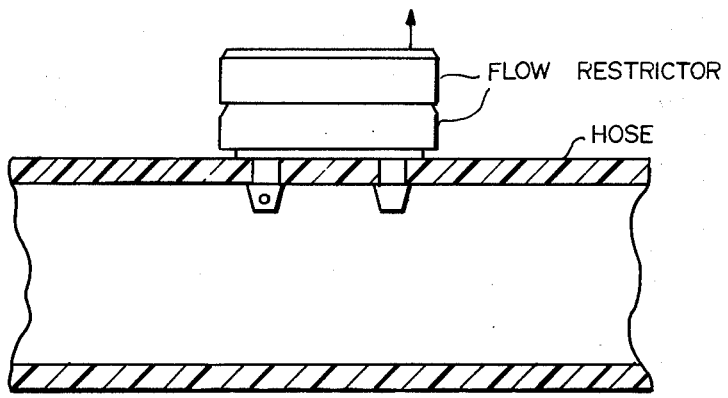
FIG. 9 is an elevation showing two flow restrictors in accordance with the present invention superposed on one another.

It will be understood that the invention is not restricted to the specific construction shown. The meandering conduit may follow a different path and it would also be within the scope of the invention to combine two or more emitters, by stacking one on the other, and directing the flow from the lower emitter to those on top of the stack (as shown, for example, in FIG. 9).

What is claimed is:
1. A flow restrictor for use as an emitting member in drip or trickle irrigation systems, comprising:
    a hollow platelike element, comprising two plate elements joined together matingly, in the interior of which is provided a conduit for flow, said conduit being provided in the form of grooves in one or both of said plate members and having an inlet means for connecting to a feed line of water and at least one outlet leading out of said hollow platelike element, said conduit meandering from said inlet means to said outlet; and
    a plurality of deflection means within said conduit for forcing the flow to perform several side-to-side bows and bends within stretches of said conduit intermediate said inlet means and said outlet;
    wherein one of said plate members is provided with a plurality of ridges extending from one end of said plate member to near the opposite end thereof, depressions being formed between the ridges and wherein the other of said plate members is provided with walls defining channels into which the ridges of said first plate member can matingly enter, the bottom of the depressions in said first plate member being flush with the upper edges of the walls defining the channels in said second plate member.

2. A flow restrictor in accordance with claim 1 wherein said conduit has a plurality of said outlets.

3. A flow restrictor in accordance with claim 1 wherein said plurality of deflection means comprise ridges extending partially across the path of flow in said conduit.

4. A flow restrictor in accordance with claim 1 wherein said inlet means comprises a nipple adapted to be inserted into a hole in a water conducting pipe.

5. A flow restrictor in accordance with claim 4 further including a second nipple adapted to be inserted into a hole in the water conducting pipe, said second nipple having a blind bore.

6. An assembly of interconnected flow restrictors, comprising:
    a plurality of flow restrictors, each in accordance with claim 1, said restrictors being connected in line.

7. An assembly of interconnected flow restrictors, comprising:

a plurality of flow restrictors, each in accordance with claim 1, said restrictors being superposed onto one another.

8. A flow restrictor in accordance with claim 1 wherein said hollow platelike element is curved to fit the curvature of a supply pipe or hose.

9. A flow restrictor for use as an emitting member in drip or tricle irrigation systems, comprising:
   a circular hollow platelike element in the interior of which is provided a conduit for flow, said conduit having an inlet means for connecting to a feed line of water and at least one outlet leading out of said element, said conduit meandering from said inlet means to said outlet; and
   a plurality of deflection means within said conduit for the flow to perform several side-to-side bows and bends within stretches of said conduit intermediate said inlet means and said outlet;
   wherein said circular hollow platelike element comprises two circular plate elements and a circular partition element, wherein the inner face of each of said plate elements is provided with a groove, said inlet means leading into the groove in one of said plate elements and said outlet means leading from the groove in the other of said plate elements, said partition element having an aperture means therein for establishing communication between the end of the groove in said first member opposite said inlet means and the end of the groove in said second member opposite said outlet, said two plate elements being press-fitted into one another with said partition element therebetween.

10. A flow restrictor in accordance with claim 9 wherein said plurality of deflection means comprise ridges extending partially across the path of flow in said conduit.

11. A flow restrictor in accordance with claim 9 wherein said inlet means comprises a nipple adapted to be inserted into a hole in a water conducting pipe, said nipple having several bores leading from the exterior to the interior thereof.

12. A flow restrictor in accordance with claim 9 wherein said conduit has a plurality of said outlets.

13. A flow restrictor in accordance with claim 9 wherein said inlet means comprises a nipple adapted to be inserted into a hole in a water conducting pipe.

14. A flow restrictor in accordance with claim 13 further including a second nipple adapted to be inserted into a hole in the water conducting pipe, said second nipple having a blind bore.

15. An assembly of interconnected flow restrictors, comprising:
   a plurality of flow restrictors, each in accordance with claim 9, said restrictors being connected in line.

16. An assembly of interconnected flow restrictors, comprising:
   a plurality of flow restrictors, each in accordance with claim 9, said restrictors being superposed onto one another.

17. A flow restrictor in accordance with claim 9 wherein said hollow platelike element is curved to fit the curvature of a supply pipe or hose.

18. A drip or trickle irrigation system, comprising:
   a supply conduit means for supplying water therethrough; and
   a plurality of flow restrictors each attached to said supply conduit means and each individual flow restrictor comprising either
   i. a hollow platelike element, comprising two plate elements joined together matingly, in the interior of which is provided a conduit for flow, said conduit being provided in the form of grooves in one or both of said plate members and having an inlet means for connecting to a feed line of water and at least one outlet leading out of said hollow platelike element, said conduit meandering from said inlet means to said outlet; and
   a plurality of deflection means within said conduit for forcing the flow to perform several side-to-side bows and bends within stretches of said conduit intermediate said inlet means and said outlet;
   wherein one of said plate members is provided with a plurality of ridges extending from one end of said plate member to near the opposite end thereof, depressions being formed between the ridges and wherein the other of said plate members is provided with walls defining channels into which the ridges of said first plate member can matingly enter, the bottom of the depressions in said first plate member being flush with the upper edges of the walls defining the channels in said second plate member, or
   ii. a circular hollow platelike element in the interior of which is provided a conduit for flow, said conduit having an inlet means for connecting to a feed line of water and at least one outlet leading out of said element, said conduit meandering from said inlet means to said outlet; and
   a plurality of deflection means within said conduit for the flow to perform several side-to-side bows and bends within stretches of said conduit intermediate said inlet means and said outlet;
   wherein said circular hollow platelike element comprises two circular plate elements and a circular partition element, wherein the inner face of each of said plate elements is provided with a groove, said inlet means leading into the groove in one of said plate elements and said outlet means leading from the groove in the other of said plate elements, said partition element having an aperture means therein for establishing communication between the end of the groove in said first member opposite said inlet means and the end of the groove in said second member opposite said outlet, said two plate elements being press-fitted into one another with said partition element therebetween.

* * * * *